March 12, 1929.  D. L. VENEGAS  1,705,320

COMBINATION DRESSER TRUNK

Original Filed Feb. 16, 1927

INVENTOR
Daniel L. Venegas.
BY
ATTORNEY

Patented Mar. 12, 1929.

1,705,320

UNITED STATES PATENT OFFICE.

DANIEL L. VENEGAS, OF SANTA BARBARA, CALIFORNIA.

COMBINATION DRESSER TRUNK.

Application filed February 16, 1927, Serial No. 168,589. Renewed January 10, 1929.

This invention relates to a combination dresser-trunk, particularly adapted for use as a dresser or bureau and as a trunk.

The object of the invention is to provide a combination dresser-trunk of novel construction and arrangement of parts, hereinafter more fully described, claimed and illustrated in the accompanying drawing, in which—

Figure 1:
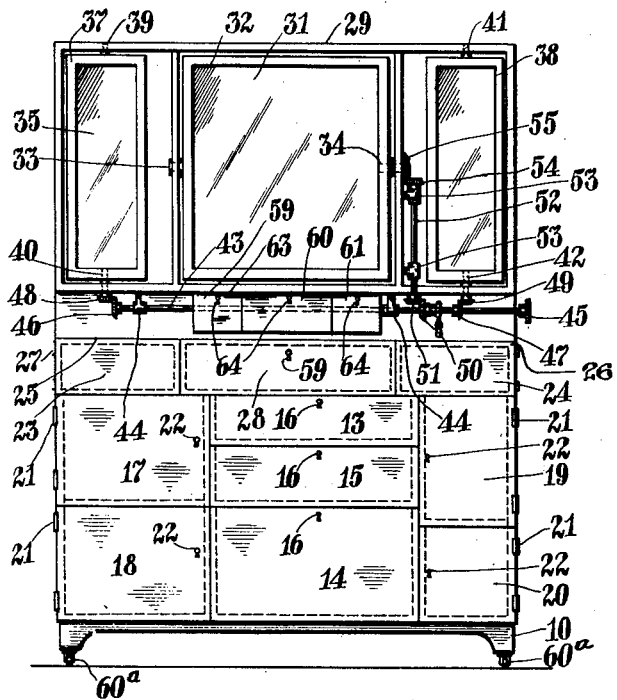
Fig. 1 is a front elevational view of my improved device in an open position, as same would appear when in use as a dresser.
Figure 2:
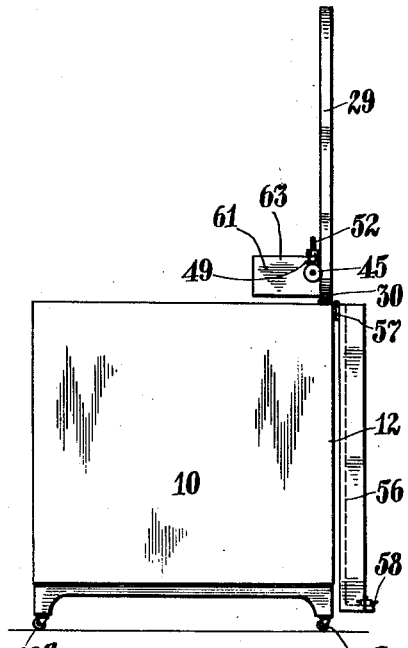
Fig. 2 is a side elevational view thereof.
Figure 3:
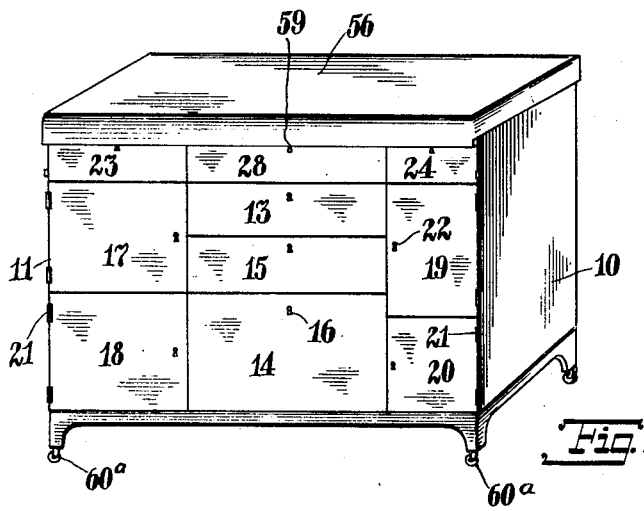
Fig. 3 is a similar view to that shown in Fig. 1, illustrating my improved device, in a closed position, as same would appear when in use as a trunk.
Figure 5:
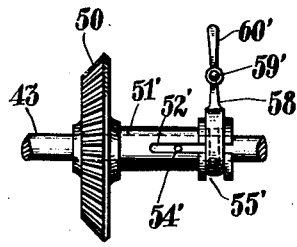
Fig. 5 is an enlarged fragmentary view of the mechanism for pivoting the mirrors as embodied in my improved device.
Figure 4:
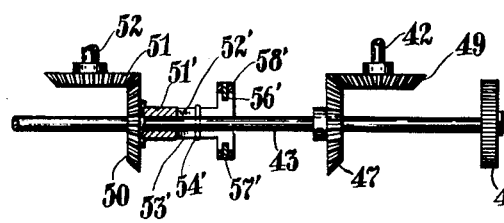
Fig. 4 is a top plan view thereof.

As here embodied my improved device comprises a frame work provided with ends 10 and 11, having a back 12, attached thereto. The above mentioned elements are adapted to slidably support the drawers 13, 14, and 15, positioned preferably at the central portion thereof, and provided with locks 16, such as commonly used, as a means of securing the said drawers in a closed position. The doors 17, 18, 19, and 20, are hinged, as at 21, in the usual manner to the sides 10 and 11, so as to provide compartments, common to dressers, bureaus and the like, and are provided with the usual locks 22.

The upper portion of the said frame work, is constructed, so as to form upper side compartments, 23 and 24, having covers 25 and 26, respectively, hinged thereto, as at 27, in the usual manner. The latter described construction, being such as will provide central upper space 28.

The mirror frame 29 is hinged as at 30, in the usual manner, to the upper portion of the back 12, and is of suitable size to cover or enclose the top of my improved device. The center mirror 31 is mounted in the frame 32, pivotally attached, as at 33 and 34, by pins, or the like, carried in the mirror frame 29. The side mirrors 35 and 36, mounted in the frames 37 and 38, respectively, pivotally attached, as at 39, 40, and 41, 42, respectively, by pins, or the like, carried in the mirror frame 29.

The shaft 43, is rotatively mounted in brackets 44, attached to the lower portion of the frame 29, and has attached thereto, at or near one extremity thereof, a hand wheel 45, knob, or the like, as a means of manually rotating the said shaft 43. The pinions 46 and 47, are attached to the shaft 43, and mesh with the pinions 48 and 49, respectively, attached to the pins 40 and 42, respectively.

The pinion 50, is attached to the tubular member 51', slidably mounted on the shaft 43. The tubular member 51' is provided with longitudinal elongated apertures 52' and 53' adapted to engage the pin 54' attached to the shaft 43, and extended therefrom in opposite directions. The tubular member 51' is provided with an axial aperture 55', adapted to be engaged by the extended elements of the pins 56' and 57', attached to the fork shaped member 58'. The forked shaped member 58', is pivotally attached, as at 59' by a pin or the like, to the lower portion of the mirror frame 29, and is provided with a handle element 60'. The latter described construction being such as will permit the pinion 50 to be slidably engaged with the pinion 51, attached to the shaft 52, rotatively mounted in the brackets 53, attached to the mirror frame 29. The pinion 54, is attached to the shaft 52, and meshes with the pinion 55, attached to the pin 34. The above described construction being such as will permit the center mirror 31 to be pivoted, or inclined vertically and which will permit the side mirrors 35 and 36, to be pivoted, or inclined horizontally simultaneously, or which will permit the side mirrors 35 and 36 to be operated independently therefrom. The side mirrors 35 and 36, and the center mirror 31, being mounted, as is common to mirrors such as ordinarily used in dressers, dressing tables and the like.

The casters 60ª, rollers, or the like, are rotatively attached to the lower extremity of the said frame work. The lower central portion of the mirror frame 29, has attached thereto, compartments 59, 60 and 61, provided with covers, hinged thereto, in the usual manner, and provided with the usual locks 64, as a means of securing the said covers in a closed position. It being understood that the above mentioned compartments 59, 60 and 61, are adapted to engage in the hereinbefore mentioned central upper space 28 provided in the upper portion of the said frame work, when the mirror frame 29, is in a closed position.

The cover 56, is hinged, as at 57, in the usual manner, to the upper portion of the back 12, and is adapted to enclose or cover, the top portion of my improved device, when the mirror frame 29, is in a closed position, and is adapted to engage over the said mirror frame. The cover 56, is provided with a catch 58, adapted to be engaged by the lock 59, attached to the upper portion of the said frame work. It should be understood that when the mirror frame 29 is to be folded inwardly into the top compartment of the trunk it is necessary that the central mirror and side mirror elements are all in the plane of the frame. The central or middle mirror element may be manually or mechanically rotated into the plane of the mirror frame 29 and the side frames may be mechanically rotated thereinto, it being understood that when the pin 54' is engaged in the slot 52' relative rotation of the mirrors is restrained and accidental displacement of the mirrors from the plane of the mirror frame 29 during rotation thereof is prevented by the operating mechanism above described.

It is obvious that I have provided, a combined dresser-trunk, having suitable compartments for such necessities, as required by persons, such as perfumery, dresses, collars, handkerchiefs, slippers, shoes, soiled and clean clothing, underwear, neckties, jewelry, ladies' wearing apparel, and the like.

Having thus described my invention, what I claim as new and desire to protect by Letters Patent of the United States is as follows:

1. A device of the class described comprising a mirror frame pivotally attached to the back of a trunk having a compartment therein for receiving said frame, a middle mirror element pivotally mounted in said frame adapted to rotate about a substantially horizontal axis, side mirror elements each positioned on one side of said middle mirror element and pivotally mounted in said frame each adapted to rotate about a vertical axis, and actuating mechanism mounted on said frame and operatively connected with said mirror elements adapted to simultaneously rotate the same for bringing said mirror elements into the plane of said frame to enable the latter to be rotated forwardly into the compartment of said trunk.

2. A device of the class described comprising a substantially rectangular mirror frame, a middle mirror member pivotally mounted in the center of said frame adapted to rotate about a substantially horizontal axis, side mirror elements pivotally mounted in said frame each adapted to rotate about a substantially vertical axis, an actuating rod journaled in said frame, bevel gears mounted on said rod substantially, on the center line of each of said side mirrors, and bevel gears, each meshed with one of the bevel gears of said rod and each connected with the pivot of one of said side elements adapted to rotate the latter in unison with each other simultaneously in opposite directions.

3. A device of the class described comprising a substantially rectangular mirror frame, a middle mirror member pivotally mounted in the center of said frame adapted to rotate about a substantially horizontal axis, side mirror elements pivotally mounted in said frame each adapted to rotate about a substantially vertical axis, an actuating rod on substantially, the center line of each of said side mirrors, a bevel gear meshed with a bevel gear on said rod and each connected with the pivot of one of said side members adapted to rotate the latter in unison with each other simultaneously in opposite directions, driving mechanism for said middle mirror comprising a shaft journaled on said frame, a bevel gear at one end thereof meshed with a bevel gear on the pivot of said middle mirror and a bevel gear on the bottom of said shaft, and a clutch mechanism comprising a sleeve slidably mounted on said actuating rod and an integral bevel gear adapted to be meshed with the gear of the lower end of said shaft for rotating said middle mirror section simultaneously with said side sections, said clutch gear being adapted to be disengaged from the gear of the driving mechanism of said middle mirror for permitting independent manipulation thereof.

In testimony whereof I have affixed my signature.

DANIEL L. VENEGAS.